July 19, 1949.    H. RABEZZANA    2,476,624
THERMOSTAT
Filed Sept. 15, 1944    3 Sheets-Sheet 1
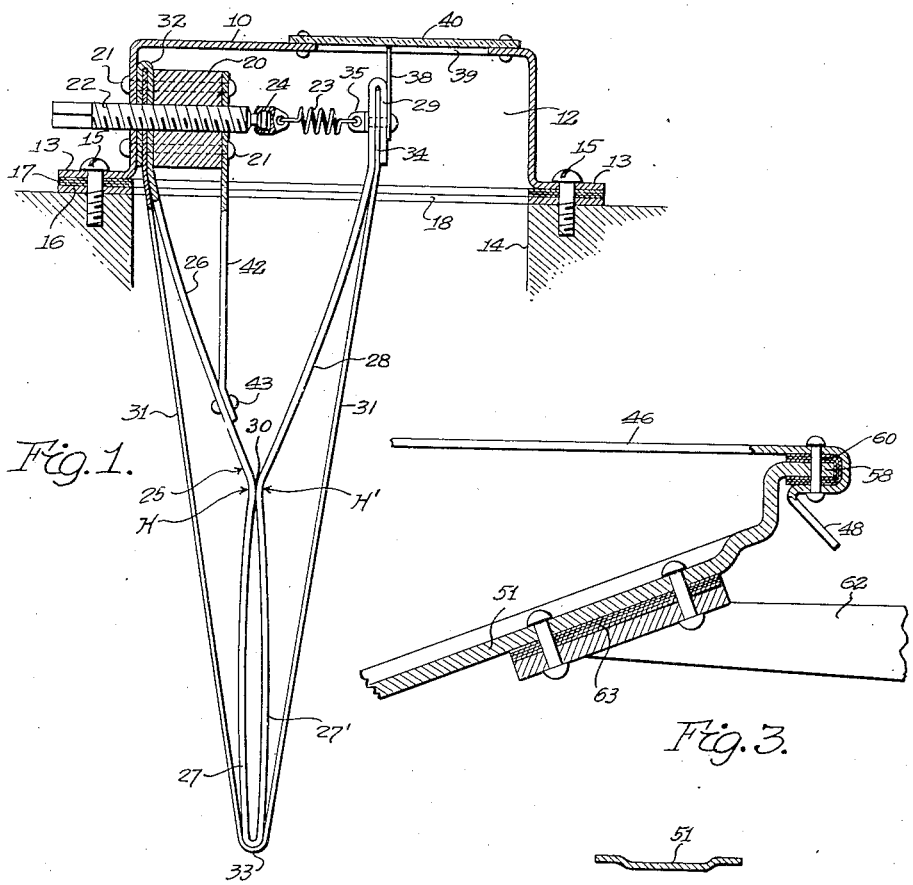
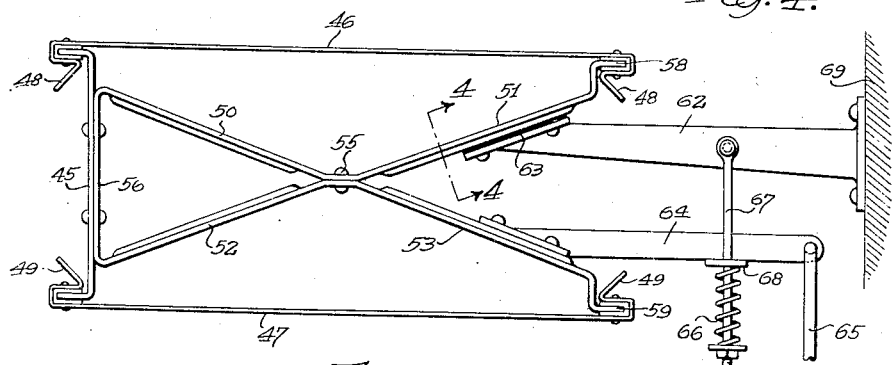
Inventor
Hector Rabezzana
By  A. E. Wilson
Attorney July 19, 1949.  H. RABEZZANA  2,476,624
THERMOSTAT Filed Sept. 15, 1944  3 Sheets-Sheet 2

Inventor
Hector Rabezzana
By A. E. Wilson.
Attorney

July 19, 1949.  H. RABEZZANA  2,476,624
THERMOSTAT
Filed Sept. 15, 1944  3 Sheets-Sheet 3

Inventor
Hector Rabezzana
A. E. Wilson
By
Attorney

Patented July 19, 1949

2,476,624

UNITED STATES PATENT OFFICE 2,476,624

THERMOSTAT

Hector Rabezzana, Fenton, Mich.

Application September 15, 1944, Serial No. 554,289

10 Claims. (Cl. 297—12)

This invention relates to temperature control devices, and more particularly to an improved temperature responsive device formed of interconnected metallic members so constructed and arranged as to provide a quick acting thermostat sensitive to slight or large variations in temperature.

The invention is applicable to control various elements, such for example as varying the fuel-air ratio in carburetors for internal combustion engines, and for other applications, particularly where it is desirable that the control unit react rapidly and respond to changes in temperature in an accurate and positive manner.

An object of this invention is therefore to provide a thermostat of light weight, sturdy in construction and fast responsive to variations in temperature.

Another object of the invention resides in the provision of a thermostat having interconnected members so arranged that a given movement of the temperature responsive member will produce a greatly multiplied movement in the indicating or controlling member.

A further object is to provide a thermostat device for actuating mechanical members by movement approximately proportionate to the variations in temperature, the elements of which device are so designed as to present a minimum resistance to the flow of fluid therepast.

A still further object of this invention resides in the provision of a thermostat having an actuating element formed of a metal having a high thermal coefficient of expansion stressed in tension and called strip, and a frame-work formed of metal having a low thermal coefficient of expansion and designed to be moved by the actuating strip. The frame work may be relatively rigid in relation to the strip except for rotation around a center of flexibility.

Still another object of the invention is to produce an improved thermostat capable of reacting rapidly and involving low internal friction or hysteresis.

A further object is to provide a thermostat capable of producing high mechanical power in relation to its weight, and to provide an accurately controlled rate of movement in response to a variation in temperature.

Another object of this invention is to provide a thermostat operable by variations in temperature and which is not affected by the pressure of the ambient fluid.

Still another object of the invention resides in the provision of a thermostat responsive either to the temperature of the surrounding fluid or to radiant heat, and optionally to temperature of the surrounding fluid and radiant heat.

Another object of this invention is to provide a thermostat of controllable force build up in relation to temperature change when the thermostat operates against other elements of properly proportioned spring rate.

Another object of this invention is to provide a thermostat with one degree of movement produced by the thermostat and high rigidity along the other axes of movement thus facilitating its operation on engines or other structure subject to vibrations but having one axis of minimum vibration.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a view partly in section, showing one form of thermostat embodying the invention;

Fig. 2 is a view in elevation of a modified form of the device;

Fig. 3 is an enlarged view, partly in section, of a detail of the device shown in Fig. 2;

Fig. 4 is a sectional view taken on the line 4—4 of Fig. 2;

Figure 5:
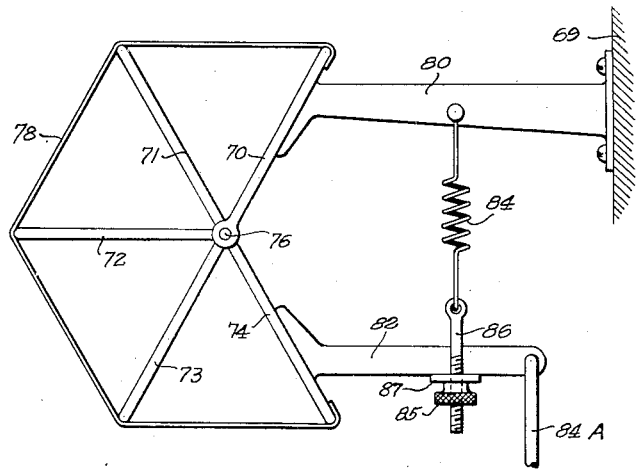
Fig. 5 is a view in elevation of another modified form.

Before explaining in detail the present invention it is to be understood that the invention is not limited in its application to the details of construction and arrangement of parts illustrated in the accompanying drawings, since the invention is capable of other embodiments and of being practiced or carried out in various ways.

The device shown in Fig. 1 comprises a box or casing 10 formed of a metal stamping or the like to provide a rectangular chamber 12. The casing 10 has flanges 13 provided with holes to permit it to be secured to a wall or other support 14, as by screws 15. A plate 16 forms a closure for the chamber, and is separated from the casing by a sheet 17 of heat insulating material. The plate 16 and sheet 17 are formed with an aperture 18 through which a temperature responsive device, now to be described, extends.

A block 20 is fixedly mounted within the chamber 12, being secured to one end of the casing 10 as by rivets 21. An adjusting screw 22 is rotatably mounted in a threaded aperture which extends through the casing and block, so that upon rotation the screw will move to the right or left as viewed in Fig. 1. A tension spring 23 is secured to the inner end of the adjusting screw by a swivel connection 24.

A member 25, called hereafter a frame, formed of a metallic strip for example of low coefficient of heat expansion such as a nickel-steel alloy, has one of its ends fixedly secured between the block 20 and the end of the casing 10. Thence its downwardly extending portion or reach 26 extends out of the chamber through aperture 18 and forms a loop 27, its upwardly extending reach 28 terminating in a folded end 29 positioned within the chamber 12. The two reaches of member 25 are bowed inwardly and contact each other at 30, where they may be welded or riveted together if desired. For best performance frame 25 should be rigid to compressive load along the axes of members 26, 27, 27' and 28 while it should be flexible to bending load along elastic hinge H and H'.

The actuating element of the thermostat comprises a metallic strip of high thermal coefficient of expansion (whereas in this case low expansion material has been selected for the frame) shown at 31, and may be formed of a strip of aluminum alloy or other suitable material in single or multiple layer. Its end 32 is received within the folded end of frame 25, and the element extends thence downwardly and embraces the loop 27 at 33, its other end 34 extending within the looped end 29 of frame 25, and being held in place by a suitable securing device 35, which receives the looped end of the tension spring 23.

The device thus far described may be used for actuating a carburetor control or the like, but as shown is provided with an indicating pointer 38 which may be viewed through a window 39 in the casing 10. The window is covered by a transparent member 40, which may be provided with a suitable graduated scale reading in suitable units such as degrees Fahrenheit.

In operation, the free end 29 of the thermostat is given its correct zero setting by a suitable adjustment of spring 23 by means of screw 22. If then the instrument is subjected to a drop in temperature, the heat-expansible element 31 will contract, and each of the bowed portions H, H' of the member 25 will be flexed in the same manner that a bow is flexed when the bowstring is tightened. The device thus constitutes in effect two thermostats in series, the additive effects of which are applied to the end 29, which, upon drop in temperature, is moved to the right as viewed in Fig. 1. The event of such movement can be read by observing the movement of the pointer 38 through window 39.

In order to give rigidity to the structure at the fixed end of the thermostat, a reinforcing member 42 may be provided, its upper end being fixedly secured to block 20 by the rivets 21, and its lower end being fixed to reach 25 by a rivet 43 or the like.

In the modified form of the invention shown in Figs. 2 to 4, the framework comprises a rigid channel member 45, having two actuating elements 46 and 47 with their ends folded under the flanges of the channel member and secured thereto, leaving freely extending end portions 48, 49. The frame of the device is formed into the X-shape shown in Fig. 2, with intersecting reaches 50, 51, 52 and 53 which are formed with longitudinal ribs as shown in Fig. 4 in order to give them rigidity. These reaches are secured together at a point 55, where the reaches are flattened so as to permit flexing of the hinge point, the base 56 of the member being likewise flattened and riveted or otherwise secured to the channel member 45 as shown. The other ends 58, 59 of the frame are bent into rectangular form and may be covered by a folded strip of heat insulating material 60, as shown in Fig. 3. The ends of the actuating elements 46, 47 are looped over the ends 58, 59 and may be insulated therefrom by the strips 60. The entire instrument is fixedly mounted on a support by means of a bracket 62 having its projecting end secured as by rivets or the like to the reach 51, a strip 63 of heat insulating material being interposed between the bracket and thermostat.

A movable member 64 is secured to reach 53 in a manner similar to that described in connection with bracket 62 and reach 51, and has a controlling rod 65 connected to its free end and extending to whatever indicating or control device is intended to be governed by the thermostat. The members 62 and 64 are interconnected by means of an adjustable spring 66 and a stem 67, pivotally connected to the bracket 62 and slidable with respect to member 64, as by means of an apertured flange or ear 68, in such manner that the spring yieldingly urges members 62 and 64 together.

The device shown in Figs. 2 to 4 may be disposed within the intake manifold of an internal combustion engine, the bracket 62 being secured to the inner wall of the manifold, indicated schematically at 69, and the rod 65 extending to the fuel valve, choke valve, heat control valve or other elements to be controlled. The arrangement of the thermostat will preferably be such that the flow of fuel air mixture or air therepast will be in a direction perpendicular to the plane of the paper in Fig. 2, so that the device will present a minimum of surface area to the flow of fluid. The purpose in providing the heat insulating strips 60 and 63 is to minimize the conduction of heat from the engine through the walls of the manifold and the bracket 62 to the temperature responsive elements 46 and 47, since it is desired that these elements respond to temperature of the ambient fluid rather than to the temperature of the adjacent metallic parts. By reason of the thermostat structure being in the form shown, with its elements spaced from each other and of low heat capacity, the thermostat will respond very promptly to any change in temperature of the fluid.

In the device shown in Fig. 5 the frame work comprises a series of radial struts 70, 71, 72, 73 and 74 having inner ends capable of rotation around an axis 76, and the temperature responsive actuating element 78 engages their outer ends and is fixed thereto as by welding, in the manner shown. A bracket 80 is secured to member 70, preferably through heat insulation as indicated in connection with Fig. 3, and a movable member 82 is secured to member 74 in a similar manner, its free end being connected to a controlling member 84—A. The members 80 and 82 are interconnected by a tension spring 84, which may be adjusted by means of a nut 85 threaded on an eye-bolt 86 and engaging a flange 87. The spring 84 maintains the temperature responsive member 78 under tension at all times, and any change in temperature will increase or decrease this tension, rotating the struts 71, 72, 73 and 74 about the axis 76, the cumulative effect of which will be transmitted to member 82 to actuate the member 84—A.

Figure 6:
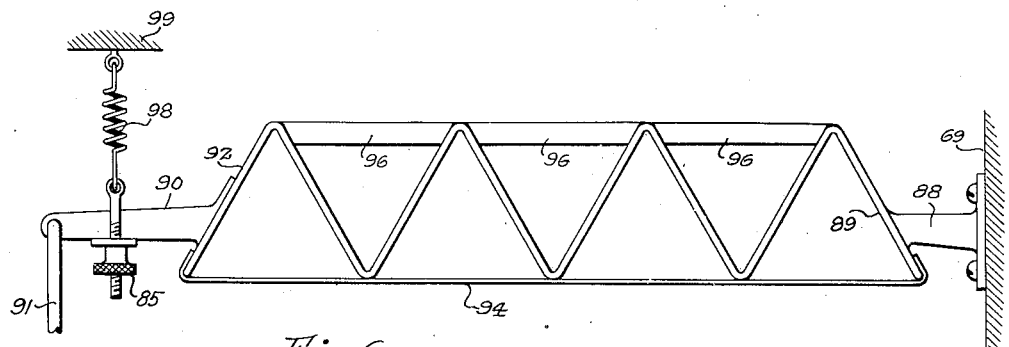
Fig. 6 is a view in elevation of another modified form.

In the form of the invention shown in Fig. 6, a bracket 88 is secured to one end 89 of a resilient member which is bent into a series of loops or bends, as shown, and a movable member 90 carrying a controlling member 91 is secured to the other end 92 of the frame member. The temperature responsive actuating element 94 has its opposite ends secured to the ends 89 and 92 of the looped member, so that contraction of member 94 due to a drop in temperature will tend to move the member 90 downwardly as viewed in Fig. 6. The upper portions of the loops are connected together by rigid members 95 of low coefficient of expansion, which may be secured to the several loops by welding or other suitable means. An adjustable tension spring 98 having one of its ends secured to a stationary member 99 tends to move the member 90 upwardly and thus maintains the temperature responsive member 94 under tension at all times. The operation of this modified form is substantially the same as that of the embodiments previously described, except that the frame 89, 92 bends or curls in one direction or the other as the temperature rises or falls.

Figure 7:
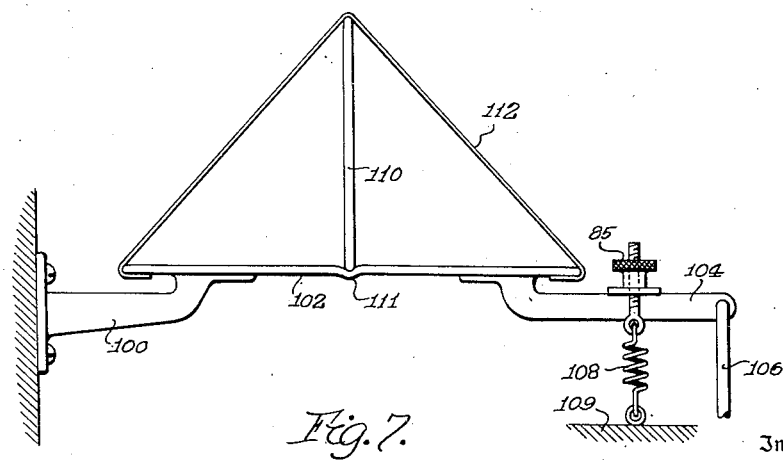
Fig. 7 is a similar view of another modified form.

In the embodiment shown in Fig. 7, a bracket 100 is secured to a flexible member 102 of low coefficient of expansion, a movable member 104 being secured to the other end of member 102. A control member 106 is connected to the free end of member 104, and a tension spring 108 is connected between the member 104 and a fixed support 109, as in the previously described embodiments. A strut 110 has its lower end seated in a groove 111 centrally formed in member 102 to form a frictionless connection of the knife-edge type. A temperature responsive actuating element 112 has one of its ends secured to member 102 adjacent the bracket 100, and thence extends over the upper end of strut 110, its other end being secured to the other end of member 102 adjacent the movable member 104. The operation of this form of the invention will be apparent from the foregoing description of the other modifications.

Figure 8:
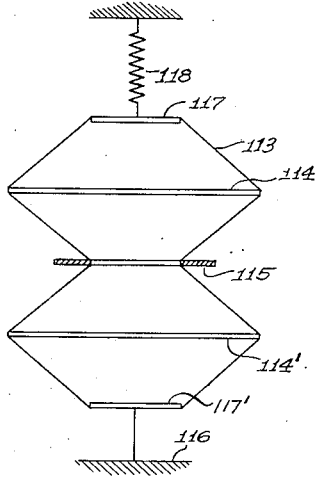
Fig. 8 is a similar view of another modified form.

The embodiment shown in Fig. 8 comprises spaced struts 114, 114' with an intermediate clamp or restraining member 115, of low coefficient of expansion. Two strips 113, of relatively high coefficient of expansion, extend from an upper member 117 over the ends of the upper strut 114, within the inner edges of the member 115, over the ends of the lower strut 114' to a lower member 117', which is secured to a fixed base 116. A tension spring 118 retains the strips 113 in tension at all times. Any change in the temperature of strips 113 will produce a movement of member 117, which may be utilized in any suitable manner.

Figure 9:
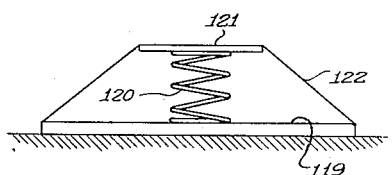
Fig. 9 is a similar view of still another modified form.

The embodiment shown in Fig. 9 comprises a rigid member 119 suitably anchored as shown, a movable member 121 held in spaced relation to member 119 by suitable means such as a compression spring 120, and a metallic strip 122 of different coefficient of expansion from that of member 119. Temperature changes of the system will produce corresponding movements of member 121.

In all forms of the invention, the framework is formed of material of different coefficient of expansion than the strip (or equivalent) supported by the frame. The responsiveness of the instrument when the temperature range permits is further accentuated by placing the temperature responsive element at the periphery of the thermostat, and making the frame of invar or equivalent. In all cases, the heat capacity of the instrument is low, so that any change in temperature will be reflected in a prompt movement of the control member of the device or in a force built up at the controlled member. Likewise in all forms of the invention, the temperature responsive element is so disposed that it may if desired be placed in proximity to a source of radiant heat, and in such cases the temperature responsive element may be coated with a material to absorb radiant heat, such as a dull black paint. On the other hand, if it is desired that the device not respond to radiant heat, the temperature responsive element may be disposed edge-on to the source of radiant heat, and if desired its surface may be finished with a bright polish or coated with a reflecting heat radiating coating such as chromium plating.

The temperature responsive element, the frame geometry, and the elastic spring rate of the system used in any of the embodiments of the invention may be modified in dimensions and materials to obtain any desired ratio between cross-sectional area and surface, to thus obtain a slow or fast response, or more or less operating force, as desired. For a given frame design made of non-thermally expanding material within the thermostat range the cross-sectional area will be generally proportional to the amount of force required to be developed from the temperature changes involved, and the length of the temperature responsive element will be generally proportional to the amplitude of movement required, the weight or volume of the strip to the work available from the thermostat for given temperature change.

In the various forms of the invention herein described, the starting point of movement of the control member in relation to the degree of temperature change may be varied by adjusting the spring tension. The rate of thermostat movement to temperature change for a given thermostat can be modified by changing the rate of the spring or its equivalent. The initial tension of the temperature responsive member may be controlled in the same manner.

Figure 10:
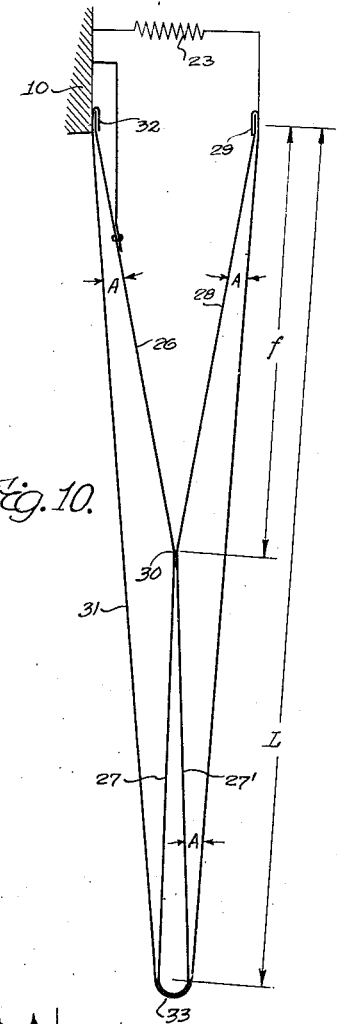
Fig. 10 is a diagrammatic view in elevation of a thermostatic device similar to that shown in Fig. 1.
Figure 11:
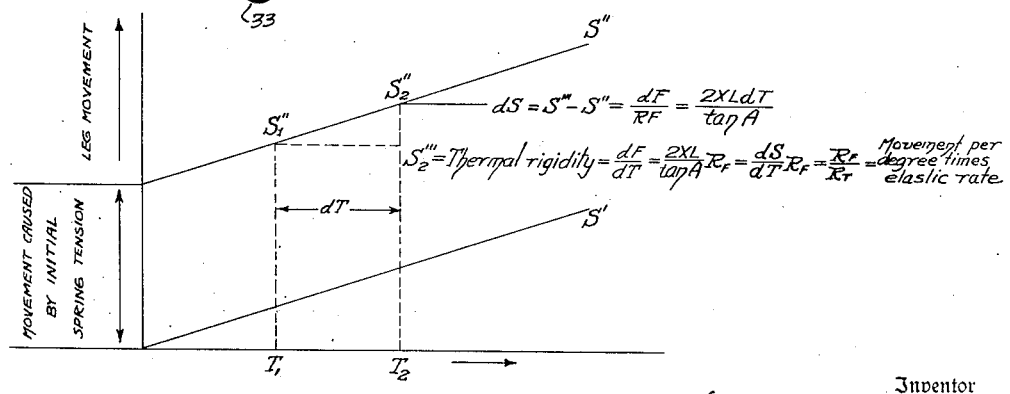
Fig. 11 is a diagram showing the relation between temperature and the movement caused by temperature variations in the device.

A mathematical analysis of the operation of the device follows, applied particularly to the diagrams shown in Figs. 10 and 11.

A denotes the angle between the members 28 and 31.

C denotes the coefficient of thermal expansion of the element 31.

L is the length of that portion of element 31 between its anchored end 29 and its looped end 33.

$f$ is the length of the member 27' or 28, measured from point 30, if said members are of equal length, as is the preferred construction.

$c$ is the coefficient of expansion of member 27'—28.

$F_s$ is the load imposed by spring 23.

$R_s$ is the rate of spring 23.

$T_1$ is the initial temperature.

$T_2$ is the final temperature.

Similar sub-numerals are applied to the other symbols to indicate status caused by the corresponding temperature.

To simplify the equations, we designate C—c as X. Then in calculating the movement caused by thermal expansion, it will be accurate enough to assume that expansion due to temperature change occurs only in the element 31, but at the rate indicated by the coefficient X.

If it is then assumed that the thermostat movement is not restrained and that $F_s$ and other forces within the instrument are negligible, $$L = 2f \cos A$$
$$L_1 = 2f \cos A_1$$
$$L_2 = 2f \cos A_2$$

but $$L_2 - L_1 = XL(T_2 - T_1)$$

or $$\cos A_2 - \cos A_1 = X \frac{L_1(T_2 - T_1)}{2f}$$

and for small values of $A_2 - A_1$ we may replace the approximate value $\cos A_2 - \cos A_1$ with $(A_2 - A_1)$ than A, where $$A = \frac{A_1 + A_2}{2}$$

Since the fixed end 32 of the thermostat is stationary, the end 33 will rotate through the sum of the two equal angular changes at each end of the strip 31, and in a similar way, end 29 will rotate through four times the angular change in A, so that the movement $S_{1-2}$ of end 29 will be approximately $$S_{1-2} = 4f(A_2 - A_1)$$

$$S_{1-2} = 2XL \frac{T_2 - T_1}{\tan A} \text{ approximately}$$

$$L = \frac{L_1 + L_2}{2} \text{ approximately}$$

From the above we have the equation for the movement of the end 29 when its movement is free:

$$S = 2XL \frac{dT}{\tan A}$$

In the case of the thermostat with its thermo-responsiveness opposed by a yielding force as that of spring 23, the following symbols may be used:

$R_t = \frac{dT}{dS} =$ The thermal rate of the thermostat.

$R_f = \frac{dF}{dS} =$ The elastic rate of the thermostat and other elastic members moved by it.

$\frac{R_f}{R_t} =$ The thermal rigidity or thermostat reacting force when the movement is restrained while the temperature changes by one degree.

$S_0 =$ The manufactured position of point 29 at manufacturing temperature $T_0$.

Fig. 11 indicates a practical method of determining the "thermal rigidity" of the device, which is equivalent to the force developed by the thermostat when the movement of end 29 is restrained, while the temperature is changed by one degree. The movement of end 29 is represented by the curve S'' in this figure.

If the temperature is changed from $T_1$ to $T_2$ and no outside forces oppose the movement of end 29, then its movement will be from $S_1''$ to $S_2''$. Now let us maintain the temperature $T_2$ constant, but by applying a force $dF$ return end 29 to $S_2''' = S_1''$ and let us call $S_2'' - S_1'' = dS''$. Assuming that the modulus of elasticity is constant, or sufficiently so within the above temperatures, $$dF = R_f dS$$

$$\frac{dF}{dT} = R_f \frac{dS}{dT} = \frac{R_f}{R_t}$$

It should be understood that specific features described in connection with any one embodiment of the invention may be applied, insofar as applicable, to other embodiments of the invention.

Although the invention has been described in connection with specific embodiments thereof, it is not limited to such embodiments, but may be embodied in other forms and modified in various ways apparent to those skilled in this art. The invention should therefore not be construed as limited except by the terms of the following claims.

The radius of the curvature of the supporting surfaces 33 and 34 are such that the combined tensile and bending stresses caused by the wrapping and unwrapping movement of the flattened or oval tubing is sufficiently below the yield point of the material used.

I claim:

1. A temperature responsive device consisting of a truss formed with two legs having two ends joined and their opposite ends diverging, a tension member having its ends connected to said opposite ends and an intermediate part bearing against said joined ends to exert force on said opposite ends tending to increase the divergence of said legs, said truss and tension member being formed of materials having different expansion coefficients, each of said legs having an elastic flexible mid-portion capable of deflecting when subjected to variations of load due to temperature change to induce a change in the tension exerted by said tension member, one of said opposite ends being fixed and the other end deflecting when the device is subjected to variations of temperature.

2. In a temperature responsive device consisting of a tension member and a compression member of different thermal expansion coefficient, the compression member consisting of two legs each relatively rigid to compression load and formed intermediate its ends by a bendable section, said legs having two ends connected by a joint and their opposite ends spaced from each other and secured to the respective ends of the tension member, said tension member being connected at an intermediate point to said joint, to provide a generally triangular shaped framework operable to change the angular relationship of the component parts in proportion to variation of temperature, the combination of two of such systems connected in series so that when one end of one system is anchored the moving end of the second system will move approximately twice the amount of a single system, the thermal rate defined as the ratio of the movement of the operating end of the thermostat to the temperature change being determined by selection of the thermal expansion coefficient of the component parts and by the angular relation of the parts and by the linear dimension of the system and by the forces applied to the system, the spring rate defined as the ratio of the force applied to the operating end of the thermostat to its movement being varied in proportion to the modulus of elasticity of the component parts and by their angular relation and by the dimension of the system and by elastic system and forces applied to the system.

3. A temperature responsive device comprising a stationary member, a V-shaped truss having one of its ends fixed to said stationary member, a projection extending axially of the truss from the apex thereof, yielding means urging the ends of the truss toward each other, and a tension member having a coefficient of expansion different from that of the truss secured to said one end, passing over said projection, and secured to the other end of the truss.

4. The invention defined in claim 3, wherein the truss and projection are formed of a single strip of metal of low thermal expansibility.

5. A temperature responsive device comprising a stationary casing, a V-shaped truss having one of its ends fixed to said casing, a loop projecting axially from the apex of the truss, a tension member having a coefficient of expansion different from that of the truss secured to said one end, passing over said loop, and secured to the other end of the truss, and yielding means urging the ends of the truss toward each other to maintain the tension member under tension.

6. A temperature measuring device comprising a V-shaped heat expansible metal strip, a relatively non-expansible strut connected to the strip at the apex and at both ends of the V, said strut being formed of a metal strip, and yielding means tending to deform the strut to thereby put the first mentioned strip under stress.

7. A temperature measuring device comprising a V-shaped metal strip, a flexible frame connected to the strip at the apex and at both ends of the V, said strip and said frame having substantially different coefficients of expansion, and yielding means deforming the frame to thereby put the strip under tension.

8. A temperature measuring device comprising a V-shaped metal strip, a Y-shaped frame formed of metal strip and connected to the first mentioned strip at the apex and at both ends of the V, said strips having substantially different coefficients of expansion so that the frame is flexed by the first mentioned strip with changes in temperature.

9. A temperature measuring device comprising a resilient Y-shaped frame formed of metal strip, a V-shaped heat-expansible strip having its ends and its apex respectively connected to the arms and the base of the Y and being stressed in tension to thereby tend to spread the arms of the Y.

10. A temperature measuring device comprising a V-shaped member of high heat expansibility, and a resilient Y-shaped frame mounted within said member and having its arms connected to the ends of the V and its base engaging the apex of the V, said member and said frame being stressed to put the member under initial tension.

HECTOR RABEZZANA.

REFERENCES CITED

The following references are of record in the file of this patent:

UNITED STATES PATENTS

| Number | Name | Date |
| --- | --- | --- |
| 543,929 | Ekehorn | Aug. 6, 1895 |
| 857,298 | Nix | June 18, 1907 |
| 1,111,138 | Cugley | Sept. 22, 1914 |
| 1,419,246 | Gee | June 13, 1922 |
| 1,461,523 | Fransson | July 10, 1923 |
| 1,765,056 | Cunningham | June 17, 1930 |
| 1,882,803 | Giesler | Oct. 18, 1932 |
| 1,956,795 | Henning | May 1, 1934 |
| 2,000,294 | Newell | May 7, 1935 |
| 2,204,791 | Davis | June 18, 1940 |
| 2,287,177 | Joesting | June 23, 1942 |

FOREIGN PATENTS

| Number | Country | Date |
| --- | --- | --- |
| 268,812 | Great Britain | Aug. 31, 1928 |

Certificate of Correction

Patent No. 2,476,624            July 19, 1949

HECTOR RABEZZANA

It is hereby certified that error appears in the printed specification of the above numbered patent requiring correction as follows:

Column 3, line 75, for the word "event" read *extent*;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*